(12) United States Patent
Busaba et al.

(10) Patent No.: US 9,063,906 B2
(45) Date of Patent: Jun. 23, 2015

(54) THREAD SPARING BETWEEN CORES IN A MULTI-THREADED PROCESSOR

(71) Applicant: International Business Machines Corporation, Armonk, NY (US)

(72) Inventors: Fadi Y. Busaba, Poughkeepsie, NY (US); Steven R. Carlough, Poughkeepsie, NY (US); Christopher A. Krygowski, Lagrangeville, NY (US); Brian R. Prasky, Wappingers Falls, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 13/628,104

(22) Filed: Sep. 27, 2012

(65) Prior Publication Data

US 2014/0089734 A1 Mar. 27, 2014

(51) Int. Cl.
  *G06F 11/00* (2006.01)
  *G06F 11/20* (2006.01)
  *G06F 11/07* (2006.01)
  *G06F 11/16* (2006.01)

(52) U.S. Cl.
  CPC ........ *G06F 11/2023* (2013.01); *G06F 11/0715* (2013.01); *G06F 11/0724* (2013.01); *G06F 11/076* (2013.01); *G06F 11/1658* (2013.01); *G06F 11/2025* (2013.01); *G06F 11/203* (2013.01); *G06F 11/2043* (2013.01)

(58) Field of Classification Search
  CPC . G06F 11/1482; G06F 11/2082; G06F 11/34; G06F 11/0787; G06F 11/3409; G06F 11/0703; G06F 9/46
  USPC ....... 714/6.31, 17; 709/224; 705/80; 712/228
  See application file for complete search history.

(56) References Cited

U.S. PATENT DOCUMENTS

| | | | |
|---|---|---|---|
| 7,134,002 B2 * | 11/2006 | Shoemaker | 712/228 |
| 7,155,600 B2 | 12/2006 | Burky et al. | |
| 7,370,243 B1 * | 5/2008 | Grohoski et al. | 714/48 |
| 7,421,571 B2 | 9/2008 | Shoemaker | |
| 7,500,240 B2 | 3/2009 | Shoemaker et al. | |
| 7,584,346 B1 | 9/2009 | Chaudhry et al. | |
| 2001/0025338 A1 * | 9/2001 | Zumkehr et al. | 712/228 |

(Continued)

OTHER PUBLICATIONS

Ranger, "Evaluating MapReduce for Multi-core and Multiprocessor Systems", Jan. 7, 2007, Stanford University, p. 1-12.*

*Primary Examiner* — Bryce Bonzo
*Assistant Examiner* — Jeison C Arcos
(74) *Attorney, Agent, or Firm* — Cantor Colburn LLP; Margaret McNamara (57) ABSTRACT

Embodiments relate to thread sparing between cores in a processor. An aspect includes determining that a number of recovery attempts made by a first thread on the first core has exceeded a recovery attempt threshold, and sending a request to transfer the first thread. Another aspect includes, selecting a second core from a plurality of cores to receive the first thread from the first core, wherein the second core is selected based on the second core having an idle thread. Another aspect includes transferring a last good architected state of the first thread from the first core to the second core. Another aspect includes loading the last good architected state of the first thread by the idle thread on the second core. Yet another aspect includes resuming execution of the first thread on the second core from the last good architected state of the first thread by the idle thread.

11 Claims, 5 Drawing Sheets

(56) References Cited

U.S. PATENT DOCUMENTS

| | | | |
|---|---|---|---|
| 2002/0138321 A1* | 9/2002 | Yuan et al. | 705/8 |
| 2003/0163675 A1* | 8/2003 | Bennett et al. | 712/228 |
| 2006/0179207 A1* | 8/2006 | Eisen et al. | 711/100 |
| 2007/0198785 A1* | 8/2007 | Kogge et al. | 711/154 |
| 2008/0128503 A1* | 6/2008 | Moore et al. | 235/454 |
| 2009/0113240 A1* | 4/2009 | Vera et al. | 714/17 |
| 2010/0158005 A1* | 6/2010 | Mukhopadhyay et al. | 370/392 |
| 2011/0320858 A1* | 12/2011 | Koktan et al. | 714/4.1 |
| 2013/0339327 A1* | 12/2013 | Belmar et al. | 707/703 |

* cited by examiner

THREAD SPARING BETWEEN CORES IN A MULTI-THREADED PROCESSOR

BACKGROUND

The present invention relates generally to error recovery in a multi-threaded processor, and more specifically to a multi-threaded, multi-core processor configured to spare threads between cores.

Processors may be configured to execute one thread of instructions at a time, or multiple threads at the same time. Processors that are configured to execute multiple threads simultaneously are said to be in simultaneous multithreading (SMT) mode. In SMT mode, hardware resources are shared among multiple software threads executing on a machine. A thread typically exists within a process, and a process may have multiple threads that share computer resources, such as memory. A thread is considered the smallest unit of processing that can be scheduled by an operating system. In a multi-core processor that is executing multiple threads, the threads may be distributed across multiple cores in the processor, and each core may be configured to execute multiple threads simultaneously. Each thread appears to have its own complete set of architecture hardware.

Hardware errors may occur during execution of threads on an SMT processor, and when not detected, hardware errors may threaten data integrity. Software-based error recovery techniques may be used to address such errors; however, software-based error recovery may be relatively slow, requiring involvement from, for example, hypervisor code in the computing system. So as to avoid delays that may occur in software-based error recovery, hardware recovery may be implemented to restore a processor to a known good or safe when the processor detects an error. During a hardware recovery process, which may last for thousands of processor cycles, the processor stops executing an instruction stream in which the error occurred, clears out an internal corrupted state, restores itself to a known error-free state, and restarts processing of the instruction stream from a point where the instruction stream last halted, which may be a known good state, or a hardware checkpoint state. During the hardware recovery process, program flow is interrupted as the corrupted state is cleared and the known good state is restored; however, any software applications that are executing on the processor are not involved in the hardware recovery process. On a multi-core processor that is running in SMT mode, hardware recovery from a detected error may require that the recovery process be applied to all threads that are running on the core on which the error occurred, although the error may be isolated to a single thread. When repeated recovery actions on the same core cannot overcome the error, the hardware recovery process, for example, may include sparing the whole state of a faulty core to another core since the failing core is assumed to have non-correctable error(s). Such whole-core sparing may disrupt the progress of one or more threads that are successfully executing on the faulty core.

SUMMARY

Embodiments include a system and computer program product for thread sparing between cores in a processor. An aspect includes determining, by a first core of the processor, that a number of recovery attempts made by a first thread on the first core has exceeded a recovery attempt threshold. Another aspect includes sending, by the first core to a processor controller in the processor, a request to transfer the first thread to another core of the processor. Another aspect includes based on receiving the request, selecting, by the processor controller, a second core from a plurality of cores of the processor to receive the first thread from the first core, wherein the second core is selected based on the second core having an idle thread. Another aspect includes transferring a last good architected state of the first thread from an error recovery logic of the first core to the second core. Another aspect includes loading the last good architected state of the first thread by the idle thread on the second core. Yet another aspect includes resuming execution of the first thread on the second core from the last good architected state of the first thread by the idle thread.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of systems and methods for thread sparing between cores in a multi-threaded processor are provided, with exemplary embodiments being discussed below in detail. Hardware-based thread sparing may be used to transfer a single failed thread from a first core to a second core in a multi-threaded, multi-core processor, without impacting other threads that are running on the first core. The determination that a thread has failed may be made based on a number of recovery attempts that occur during execution of the thread exceeding a recovery attempt threshold. When it is determined that a thread has failed on the first core and a transfer of the failed thread is necessary, the last good architected state of the failed thread is transferred from error recovery logic in the first core to the second core, and execution of the failed thread may resume using the resources of an idle thread in the second core from the failed thread's last good architected state. In some embodiments, the resources of a good thread on the first core may be used to transfer the last good architected state of the failed thread to the second core.

The cores in a multi-threaded, multi-core processor may each have a predetermined maximum number of simultaneous threads (for example, 8 to 16 threads) that are supported by the core. There may be hardware resources that are designated in the core for each thread, up to the predetermined maximum number of threads. If a core is currently executing a number of threads that is less that this predetermined maximum number, the core has one or more currently idle threads, and the resources that are designated for the one or more currently idle threads are available to take over execution of a failed thread. In some embodiments, the first core may be a partially bad core that is capable of continuing execution of one or more threads after transfer of the failed thread, and the second core may be a core that has a currently idle thread that is available to take over execution of the failed thread. In other embodiments, the first core may comprise a fully bad core, and it may be necessary to spare all of the threads from the first core to other cores in the processor. In such an embodiment, the threads from the first core may be distributed across multiple cores in the processor. The processor controller may determine one or more cores in the processor have currently idle threads, and the threads from the fully bad first core may be transferred to the one or more cores to resume execution using the identified currently idle threads. In further embodiments, in which the first core comprise a partially bad core, the first core may attempt to resume the execution of a failed thread using the resources of a currently idle thread on the partially bad core before determining that transfer of the thread to another core is required.

A thread on a first core may fail due to, for example, faulty hardware on a core, resulting in a single, unrecoverable event that causes multiple recovery attempts by the thread in some embodiments. In other embodiments, there may be a lack of forward progress by the thread due to a plurality of recoverable errors and associated recovery attempts that occur during execution of the thread. When the number of recovery attempts that are made during execution of a thread exceeds a recovery attempt threshold that is defined in error recovery logic in the first core, it is determined that the thread has failed. A single unrecoverable error comprises an error that cannot be fixed or corrected by recovery action. For example, a stuck-at fault at one of the signals, or at a latch output, of the processor, may result in an unrecoverable error. If a latch output is stuck at 1, the output appears to be tied to a '1' and can never be over-written to be a '0' even after multiple recovery attempts. An example of a recoverable error includes bit flips; multiple bit flips and recoveries during execution of a thread may result in a determination that the thread has failed.

When a thread is determined to have failed, the thread is first fenced from other threads on the first core by flushing any instructions in the pipeline that belong to the failed thread, blocking the failed thread from instruction fetching, and sending any storage data of the thread to higher level memory in the processor where it can be used as needed by other running threads running in the system. Once the failed thread is fenced, the failed thread may be transferred from the first core to the second core. A failed thread is transferred by transferring the last good architected state of the failed thread and resuming execution from the last good architected state using the resources of an idle thread on the second core. The last good architected state of a thread comprises a point in the thread to which the thread may be rewound in the event of an error, and may include, but is not limited to, any register values or program counters belonging to the thread. The last good architected state of a thread may be updated each time an instruction of the thread is checkpointed (i.e., successfully completed). Last good architected states for all threads executing on a core are stored in error recovery logic in the core. The last good architected state of a failed thread may be transferred from the first core to the second core in any appropriate manner. In some embodiments, the last good architected state of the failed thread may be transferred from the first core to the second core using the resources of a good thread that is running on the first core in some embodiments. For example, the resources of the good thread may be used to log out the last good architected state of the failed thread and transfer the last good architected state of the failed thread in a local processor memory in the processor controller. In other embodiments, the last good architected state of the failed thread may be transferred from the first core to the second core via a serial communication bus that links the cores in the multi-core processor.

Figure 1A:
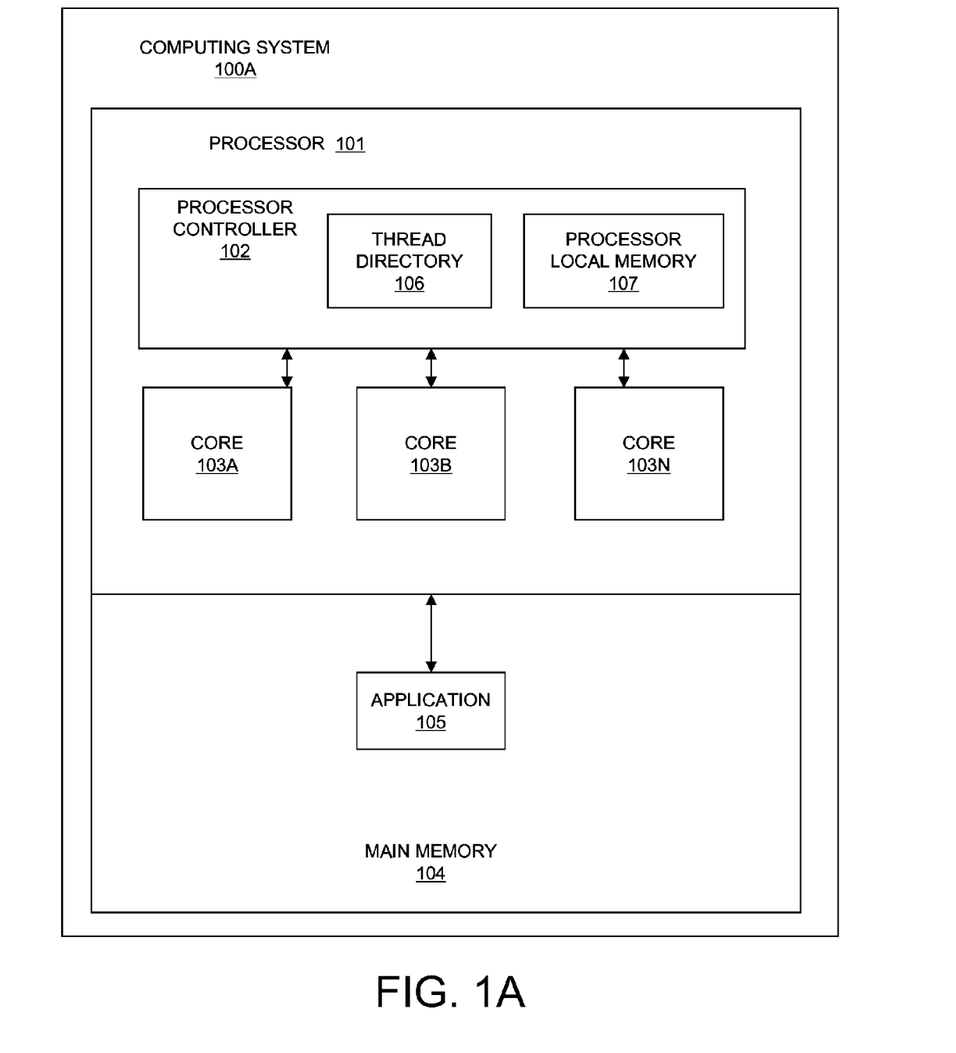
FIG. 1A depicts a computing system for thread sparing between cores in a multi-threaded processor in accordance with an embodiment.
Figure 1B:
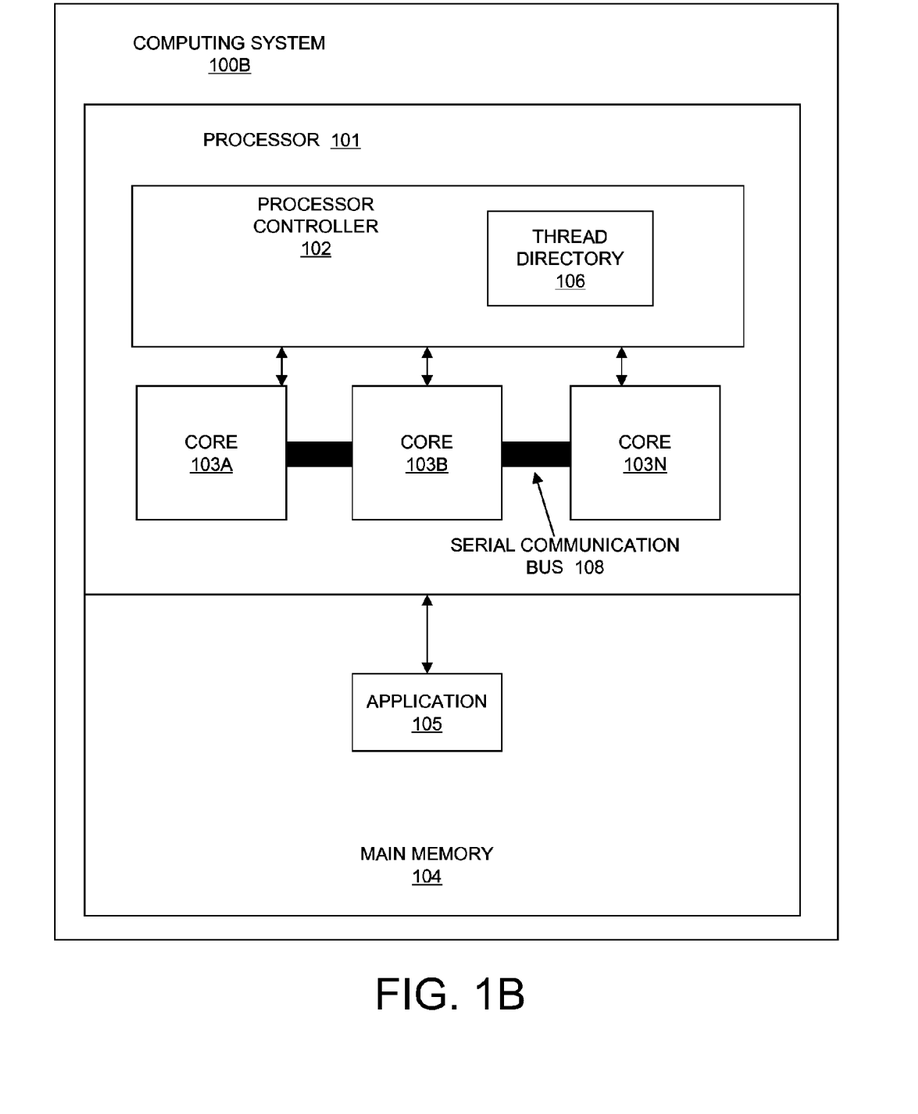
FIG. 1B depicts a computing system for thread sparing between cores in a multi-threaded processor in accordance with another embodiment.

First and second embodiments of computing systems for thread sparing between cores in a processor are shown in FIG. 1A and FIG. 1B. FIG. 1A depicts a computing system 100A for thread sparing between cores in a processor in accordance with the first embodiment. The computing system 100A includes processor 101, which comprises a multi-core SMT processor. The processor 101 is capable of running a plurality of threads simultaneously on each of cores 103A-N. The processor 101 includes a processor controller 102 that is in communication with each of the plurality of cores 103A-N. The processor controller 102 further includes a thread directory 106, which indicates, for each thread that is executing on the processor 101, the particular core of cores 103A-N upon which the thread is located. The processor controller 102 further includes a processor local memory 107 that is used for signaling between the cores 103A-N in the processor 101. Applications, such as application 105, run in main memory 104 on computing system 100A. Application 105 may be executed by one or more threads in processor 101; these threads may be allocated among cores 103A-N in any appropriate manner. FIG. 1B depicts a computing system 100B for thread sparing between cores in a processor in accordance with the second embodiment. Computing system 100B also includes processor 101, processor controller 102, cores 103A-N, main memory 104, application 105, and thread directory 106, as were described above with respect to FIG. 1A. Computing system 100B further includes a serial communication bus 108 that is used for signaling between the cores 103A-N in the processor 101.

Figure 2:
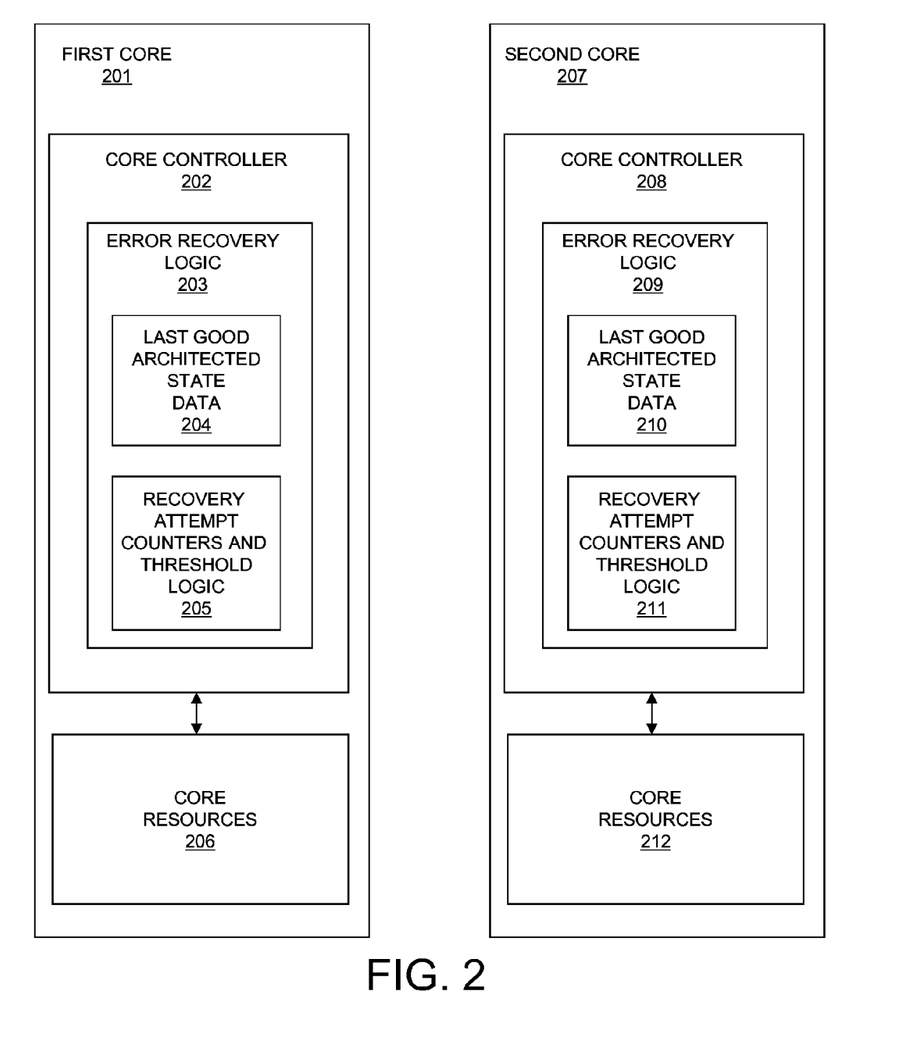
FIG. 2 depicts first and second cores in accordance with an embodiment.

FIG. 2 depicts a first core 201 and a second core 207 in accordance with an embodiment. First core 201 and second core 207 may each comprise any of cores 103A-N that are shown in the computing systems 100A-B of FIGS. 1A-B, and cores 103A-N may each comprise the elements that are shown in each of first core 201 and second core 207. In various embodiments, first core 201 and second core 207 may be signal between one another via a processor local memory 107 as is shown in FIG. 1A, or via a serial communication bus 108 as is shown in FIG. 1B. First core 201 includes a core controller 202 that controls access to core resources 206 by a one or more threads that are running on first core 201. The core resources 206 may comprise, for example, a pipeline and hardware registers. The core controller 202 further includes error recovery logic 203 that stores last good architected state data 204 for all the threads that are executing on first core 201. Error recovery logic 203 also maintains respective recovery attempt counters for each thread that executes on first core 201 in recovery attempt counters and threshold logic 205. In recovery attempt counters and threshold logic 205, the recovery attempt counter for a thread may be incremented whenever a recovery attempt is made during execution of the thread. The recovery attempt counter may then be compared to a recovery attempt threshold to determine whether the thread has failed. This recovery attempt threshold may be variable based on the state of the first core 201 in some embodiments. Second core 207 also includes a respective core controller 208 with error recovery logic 209, and core resources 212, such as were discussed with respect to first core 201. Core controller 208 controls access by a plurality of threads that are executing on second core 207 to core resources 212. Error recovery logic 209 stores last good architected state data 210 for all the threads that are executing on second core 207, and also includes recovery attempt counters and threshold logic 211. An individual thread may be transferred from first core 201 to second core 207 in the event of failure of the thread on the first core 201; this is discussed below with respect to FIG. 3. Any appropriate number of threads may be executing on either of first core 201 and second core 207 at any given time, up to a predetermined maximum number of threads.

The last good architected state data 204/210 in error recovery logic 203/209 is used for recovery attempts that are performed in the event of an error, and gives a point in a thread to which the thread may be rewound in the event of an error. Whenever an instruction belonging to a particular thread checkpoints (i.e., successfully completes) in the pipeline in core resources 206 of the first core 201, the last good architected state of the particular thread in the last good architected state data 204 is updated to reflect the checkpoint event. A last good architected state for a thread may include but is not limited to any register values or program counters belonging to the thread. In the event of an error during execution of a thread on first core 201, the error recovery logic 203 uses the last good architected state stored in last good architected state data 204 for that thread to make a recovery attempt. The recovery attempt may comprise flushing any instructions of the thread that encountered the error from the pipeline in core resources 206 in the first core 201, and then loading the last good architected state of the thread using the resources of the thread that encountered the error and attempting to resume execution of the thread from the last good architected state.

Figure 3:
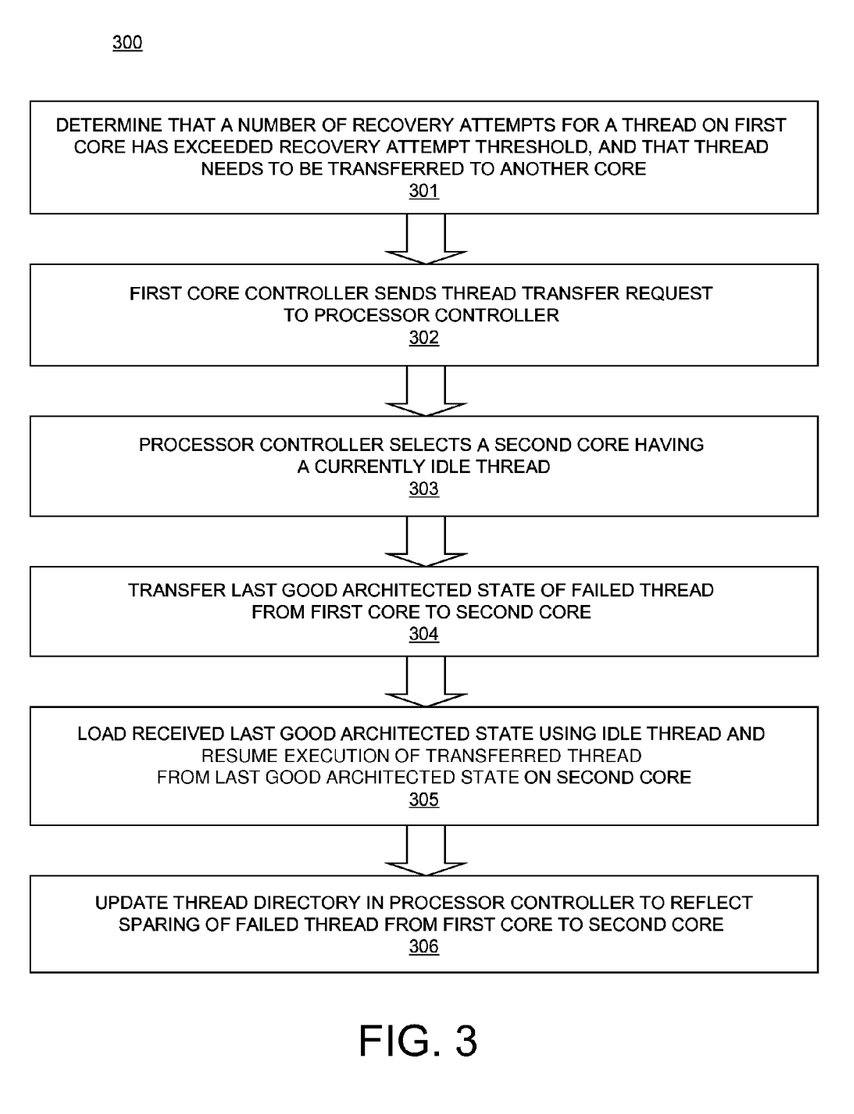
FIG. 3 depicts a process flow for thread sparing between cores in a multi-threaded processor in accordance with an embodiment.

FIG. 3 illustrates a flowchart of an embodiment of a method 300 for thread sparing between cores in a multi-threaded processor. The flow of method 300 of FIG. 3 is discussed with respect to FIG. 1A, FIG. 1B, and FIG. 2. First, in block 301, it is determined that a thread on a first core (for example, first core 103A/201) has failed based on a number of recovery attempts that have been performed during execution of the thread, and that the thread needs to be transferred to another core. The determination that the thread has failed and needs to be transferred to another core may be made by error recovery logic 203 on the first core 103A/201. Thread failure may be determined based on encountering of a single unrecoverable error by the thread and making multiple recovery attempts from the unrecoverable error in some embodiments. In other embodiments, a plurality of recoverable errors and associated recovery attempts may occur during execution of the thread. The number of recovery attempts made during execution of the thread is tracked by a recovery attempt counter for the thread in recovery attempt counters and threshold logic 205, and compared to a recovery attempt threshold that is defined in recovery attempt counters and threshold logic 205. When the recovery attempt counter for a thread exceeds the recovery attempt threshold, it is determined that the thread has failed. In some embodiments, the recovery attempt threshold that is maintained by recovery attempt counters and threshold logic 205 may be variable based on the state of the core 103A/201; for example, the value of the recovery attempt threshold may vary based on the number of threads currently running on the first core 103A/201. During a recovery attempt, instructions belonging to the thread that experienced the error are flushed from the pipeline and the state of the thread is overwritten to its last good architected state. The presence of many threads running on the same core limits the amount of hardware and states that may be flushed and restored by the recovery attempt, as recovery attempt for a single thread does not affect the state of other good threads on the core. Therefore, the recovery attempt threshold may be increased as the number of threads running on the core increases such that, for each recovery attempt, there is a higher chance to flush all the latches in the pipeline.

Once thread failure is determined during block 301, it is then determined whether the thread needs to be transferred to another core. In some embodiments in which the first core 103A/201 comprises a partially bad core, the error recovery logic 203 may attempt to resume the execution of a failed thread from its last good architected state using the resources of another currently idle thread on the first core 103A/201 before determining that transfer of the thread to another core is necessary. If this attempt to resume execution of the failed thread using the idle thread is unsuccessful, or if there is no currently available idle thread on the first core 103A/201, the error recovery logic 203 may then determine that the failed thread needs to be transferred to another core. Otherwise, the idle thread may resume execution of the failed thread on the first core 103A/201, and the filed thread may not need to be transferred. The first core 103A/201 may have any appropriate number of additional threads currently executing in addition to the failed thread.

Next, in block 302 of FIG. 3, the core controller 202 in the first core 103A/201 sends a request to the processor controller 102 to transfer the failed thread to another core of cores 103B-N. Flow then proceeds to block 303 of method 300, in which, in response to the thread transfer request, the processor controller 102 determines a second core (for example, core 103B/207) of cores 103B-N that has a currently idle thread that is available to take over execution of the failed thread. The second core 103B/207 may be determined based on the thread directory 106, which lists the threads that are executing on each of cores 103A-N, in some embodiments. In other embodiments, the processor controller 102 may poll the other cores 103B-N to determine any cores that have an idle thread. If multiple cores of cores 103B-N have currently idle threads, the transfer distance between the first core 103A/201 and the cores that are determined to have currently idle threads may also be taken into account in selecting the second core in some embodiments so as to reduce the distance across which the failed thread must be transferred. The transfer distance may be determined based on a number or hops (e.g., nodes or cores), that the failed thread will go through during the transfer from the first core 103A/201 to the second core 103B/207. The second core 103B/207 may have any appropriate number of threads currently executing in addition to the idle thread.

Flow of method 300 of FIG. 3 now proceeds to block 304, in which the last good architected state of the failed thread is transferred from the last good architected state data 204 in error recovery logic 203 in the first core 103A/201 to the second core 103B/207. A first embodiment of the execution of block 304 of method 300 is discussed with respect to FIG. 1A and FIG. 2, and a second embodiment of the execution of block 304 is discussed with respect to FIG. 1B and FIG. 2. In the first embodiment of block 304, the last good architected state of the failed thread is transferred via processor local memory 107 in processor controller 102. First, a transferring thread is first determined on the first core 103A/201. The transferring thread comprises a good thread that is currently running on the first core 103A/201. The transferring thread may be selected based on the relative priority of the thread in some embodiments; for example, a lower-priority thread of the threads that are executing on first core 103A/201 may be selected by the core controller 202 as the transferring thread. The transferring thread on the first core 103A/201 reads out the last good architected state of the failed thread from last good architected state data 204 in error recovery logic 203, and transfers the last good architected state of the failed thread to processor local memory 107 in processor controller 102. When the transferring thread completes transferring the last good architected state of the failed thread to the processor local memory 107, the core controller 202 in the first core 103A/201 may signal the processor controller 102 that the transfer of the last good architected state of the failed thread is complete. The processor controller 102 then transfers the last good architected state of the failed thread from the processor local memory 107 to the second core 103B/207.

In the second embodiment of execution of block 304, the core controller 202 on the first core 103A/201 transfers the last good architected state of the failed thread from last good architected state data 204 in error recovery logic 203 to serial communication bus 108 via a serial communication bus interface in the first core 103A/201, and the serial communication bus 108 then transfers the last good architected state of the failed thread from the first core 103A/201 to the second core 103B/207. In some embodiments, depending on which core of cores 103A-N is the core having the failed thread, and which core of cores 103A-N is selected as the second core that receives the failed thread from the first core, the serial communication bus 108 may transfer the last good architected state of the failed thread across multiple cores of cores 103A-N from the first core to the second core.

Flow of method 300 now proceeds to block 305, in which the second core 103B/207 receives the last good architected state of the failed thread and loads the received last good architected state using the idle thread that was identified in block 303 of method 300. The idle thread then resumes execution of the failed thread on the second core 103B/207 using core resources 212 from the point that is described by the received last good architected state. In some embodiments, a specific instruction, for example, a load-thread-state instruction, may be provided in the computing system and used to cause the idle thread to load the last good architected state of the failed thread. The received last good architected state is also stored in last good architected state data 210 in error recovery logic 209. Lastly, in block 306 of method 300, the thread directory 106 in processor controller 102 is updated to reflect the sparing of failed thread from the first core 103A/201 to second core 103B/207.

In some embodiments in which first core 103A/201 comprises a partially bad core, first core 103A/201 may continue executing one or more remaining threads after transfer of the failed thread to second core 103B/207 as is described in method 300 of FIG. 3. In other embodiments in which first core 103A/201 is a fully bad core, all of the threads executing on first core 103A/201 may need to be transferred to other cores. In such an embodiment, the threads may be distributed from the fully bad core across different cores of cores 103B-N that have currently idle threads. This may be accomplished by transferring the last good architected states of each of the threads on first core 103A/201 to other cores of cores 103B-N as is described by method 300 of FIG. 3.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 4:
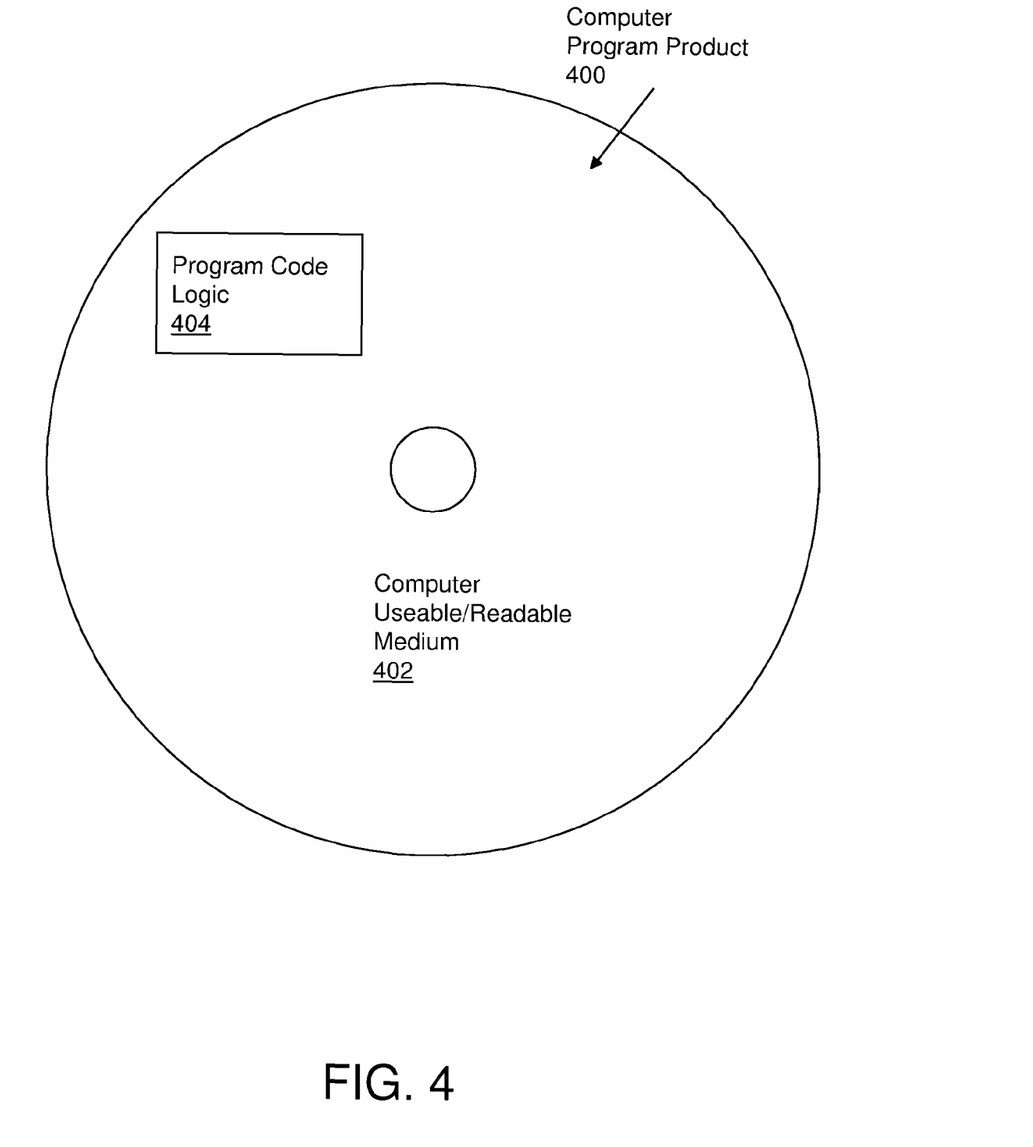
FIG. 4 illustrates a computer program product in accordance with an embodiment.

Referring now to FIG. 4, in one example, a computer program product 400 includes, for instance, one or more storage media 402, wherein the media may be tangible and/or non-transitory, to store computer readable program code means or logic 404 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Technical effects and benefits include sparing of failed threads across cores in a multi-threaded, multi-core processor without disturbing execution of other threads.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for thread sparing between cores in a processor, the system comprising:
   the processor, the processor comprising a processor controller and a plurality of cores in communication with the processor controller, the system configured to perform a method comprising:
   determining, by a first core of the plurality of cores of the processor, that a number of recovery attempts made by a first thread on the first core has exceeded a recovery attempt threshold;
   sending, by the first core to the processor controller in the processor, a request to transfer the first thread to another core of the processor;
   based on receiving the request, selecting, by the processor controller, a second core from the plurality of cores of the processor to receive the first thread from the first core, wherein the second core is selected based on the second core having an idle thread;
   transferring a last good architected state of the first thread from an error recovery logic of the first core to the second core;
   loading the last good architected state of the first thread by the idle thread on the second core; and
   resuming execution of the first thread on the second core from the last good architected state of the first thread by the idle thread;
   wherein transferring the last good architected state of the first thread from the error recovery logic of the first core to the second core comprises:
   selecting a second thread on the first core as a transferring thread, wherein the second thread is distinct from the first thread, and wherein the second thread is selected as the transferring thread based on a priority of the second thread;
   transferring the last good architected state of the first thread from the error recovery logic of the first core to a processor local memory of the processor controller by the transferring thread; and
   transferring the last good architected state of the first thread from the processor local memory to the second core by the processor controller.

2. The system of claim 1, wherein the recovery attempts made by the first thread are made in response to a single unrecoverable error.

3. The system of claim 1, wherein the recovery attempts made by the first thread are made in response to a plurality of recoverable errors.

4. The system of claim 1, wherein the recovery attempt threshold is variable based on a number of threads currently executing on the first core.

5. The system of claim 1, wherein the second core is selected to receive the first thread further based on a distance between the first core and the second core.

6. The system of claim 1, wherein the second core has one or more non-idle threads executing on the second core in addition to the idle thread; and further comprising continuing execution of one or more remaining threads by the first core after resuming execution of the first thread on the second core.

7. A computer program product for implementing thread sparing between cores in a processor, the computer program product comprising:

a non-transitory storage medium readable by a processing circuit and storing instructions for execution by the processing circuit for performing a method comprising:

determining, by a first core of the processor, that a number of recovery attempts made by a first thread on the first core has exceeded a recovery attempt threshold;

sending, by the first core to a processor controller of the processor, a request to transfer the first thread to another core of the processor;

based on receiving the request, selecting, by the processor controller, a second core from a plurality of cores of the processor to receive the first thread from the first core, wherein the second core is selected based on the second core having an idle thread;

transferring a last good architected state of the first thread from an error recovery logic of the first core to the second core;

loading the last good architected state of the first thread by the idle thread on the second core; and resuming execution of the first thread on the second core from the last good architected state of the first thread by the idle thread;

wherein transferring the last good architected state of the first thread from the error recovery logic of the first core to the second core comprises:

selecting a second thread on the first core as a transferring thread, wherein the second thread is distinct from the first thread, and wherein the second thread is selected as the transferring thread based on a priority of the second thread;

transferring the last good architected state of the first thread from the error recovery logic of the first core to a processor local memory of the processor controller by the transferring thread; and transferring the last good architected state of the first thread from the processor local memory to the second core by the processor controller.

8. The computer program product of claim 7, wherein the recovery attempts made by the first thread are made in response to a single unrecoverable error.

9. The computer program product of claim 7, wherein the recovery attempts made by the first thread are made in response to a plurality of recoverable errors.

10. A computer system for thread sparing between cores in a processor, the system comprising:

the processor, the processor comprising a processor controller and a plurality of cores in communication with the processor controller, the system configured to perform a method comprising:

determining, by a first core of the plurality of cores of the processor, that a number of recovery attempts made by a first thread on the first core has exceeded a recovery attempt threshold;

sending, by the first core to the processor controller in the processor, a request to transfer the first thread to another core of the processor;

based on receiving the request, selecting, by the processor controller, a second core from the plurality of cores of the processor to receive the first thread from the first core, wherein the second core is selected based on the second core having an idle thread;

transferring a last good architected state of the first thread from an error recovery logic of the first core to the second core;

loading the last good architected state of the first thread by the idle thread on the second core; and resuming execution of the first thread on the second core from the last good architected state of the first thread by the idle thread;

wherein the second core has one or more non-idle threads executing on the second core in addition to the idle thread; and further comprising continuing execution of one or more remaining threads by the first core after resuming execution of the first thread on the second core.

11. A computer program product for implementing thread sparing between cores in a processor, the computer program product comprising:

a non-transitory storage medium readable by a processing circuit and storing instructions for execution by the processing circuit for performing a method comprising:

determining, by a first core of the processor, that a number of recovery attempts made by a first thread on the first core has exceeded a recovery attempt threshold;

sending, by the first core to a processor controller of the processor, a request to transfer the first thread to another core of the processor;

based on receiving the request, selecting, by the processor controller, a second core from a plurality of cores of the processor to receive the first thread from the first core, wherein the second core is selected based on the second core having an idle thread;

transferring a last good architected state of the first thread from an error recovery logic of the first core to the second core;

loading the last good architected state of the first thread by the idle thread on the second core; and resuming execution of the first thread on the second core from the last good architected state of the first thread by the idle thread;

wherein the second core has one or more non-idle threads executing on the second core in addition to the idle thread; and further comprising continuing execution of one or more remaining threads by the first core after resuming execution of the first thread on the second core.

* * * * *